P. ADLER.
AEROPLANE DRIVING MECHANISM.
APPLICATION FILED AUG. 31, 1920.

1,389,471.

Patented Aug. 30, 1921.

P. Adler INVENTOR

BY Victor J. Evans ATTORNEY

UNITED STATES PATENT OFFICE.

PHILIP ADLER, OF MADISON, WISCONSIN, ASSIGNOR OF ONE-HALF TO CHRIS. UEBERSETZIG, OF MADISON, WISCONSIN.

AEROPLANE DRIVING MECHANISM.

1,389,471.  Specification of Letters Patent.  Patented Aug. 30, 1921.

Application filed August 31, 1920. Serial No. 407,202.

*To all whom it may concern:*

Be it known that I, PHILIP ADLER, a citizen of the United States, residing at Madison, in the county of Dane and State of Wisconsin, have invented new and useful Improvements in Aeroplane Driving Mechanism, of which the following is a specification.

This invention relates to drive mechanism for vehicles and more particularly to aeroplanes and has for its primary object the location and operation of individual propellers whereby the travel of the aeroplane may be more efficiently and accurately controlled.

An object of the invention is the arrangement of a number of propellers, the angle of which may be changed so as to drive an aeroplane efficiently in a plurality of directions.

A feature of the invention is the novel manner of mounting individual propellers and connecting same to a single manually operated shaft so that all propellers can be simultaneously adjusted.

With these and other objects in view the invention will be better understood from the following detailed description taken in connection with the accompanying drawing wherein.

Figures 1, 2:
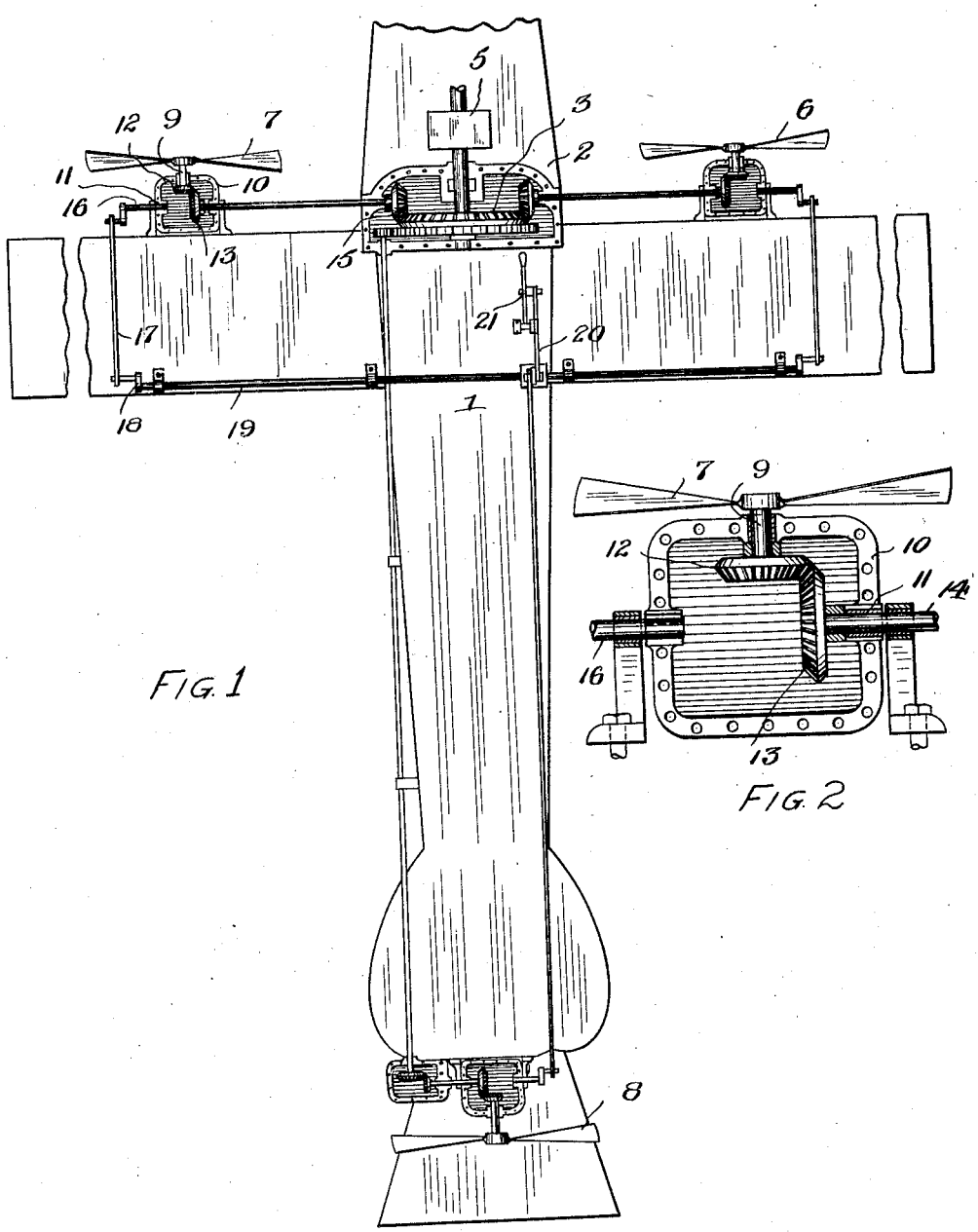
Figure 1 is a diagrammatic view of the mechanism.
Fig. 2 is a detailed view of one of the brackets.

Again referring to the drawing illustrating in a diagrammatic manner one construction of my invention the numeral 1 designates a supporting frame, which may be of any suitable construction and connected to the aeroplane in any suitable manner. This frame is provided with an extension 2 that supports a main drive gear 3 driven by the shaft 4 of the internal combustion engine through the clutch 5, diagrammatically illustrated, and which is operated in any well known manner. In the drawing I have illustrated three propellers 6, 7, and 8 for the sake of clearness, but I wish it to be understood that there may be any number of propellers used in accordance with my invention. As propellers 6, 7, and 8 and their associated mechanism are identical in construction the following description is limited to propeller 7. The propeller 7 has a stub shaft 9 rotatably supported in a bracket 10 which, in turn is swingingly connected to the frame as indicated at 11. At this point I wish to call attention to the fact that in practice ball bearings will be used to reduce friction but for the sake of clearness these ball bearings have not been shown. The stub shaft 9 has a beveled gear 12 connecting the second beveled gear 13 mounted upon a shaft 14. This shaft 14 is rotatably supported by the frame and, owing to the novel manner in which the brackets are mounted for swinging movement it is not necessary for this shaft 14 to be displaced. A gear 15 establishes a drive connection between the shaft 14 and main gear 3. The bracket is provided with a crank arm 16 and is connected by a link 17 to the crank arm 18 on the operating shaft 19. This operating shaft 19 is rotatably supported by the frame and has a link connection 20 with the ratchet lever 21 that is manually operated.

From the foregoing description taken in connection with the accompanying drawing it will be apparent that I provide an economically constructed mechanism that is capable of driving an aeroplane efficiently in any direction and which will greately facilitate rising of the aeroplane from its landing field.

It is of course, to be understood that the manner of associating the parts and the connection with the frame may be changed at will and in fact the connection may be such that the position of the propellers may be entirely reversed so as to accomplish various effects, therefore, I do not desire to be limited in any manner except as set forth in the claim hereunto appended.

Having thus described my invention what I claim is:

Aeroplane driving mechanism comprising a main drive shaft, a pair of front propellers, a rear propeller, individual drive connections from said shaft to each of said front propellers and to said rear propeller, a swingingly mounted frame supporting each propeller, a crank arm connected to each frame, a single operating shaft extending transversely of the aeroplane, crank arms connected thereto, links connecting the crank arms of the operating shaft to the crank arms of the frames, and a single lever for giving movement to said operating shaft.

In testimony whereof I affix my signature.

PHILIP ADLER.